(12) United States Patent
Dehez et al.

(10) Patent No.: US 11,239,720 B2
(45) Date of Patent: Feb. 1, 2022

(54) WINDING FOR AN ELECTRICAL MACHINE

(71) Applicant: UNIVERSITE CATHOLIQUE DE LOUVAIN, Louvain la-Neuve (BE)

(72) Inventors: Bruno Dehez, Liernu (BE); François Baudart, Bourlers (BE)

(73) Assignee: UNIVERSITE CATHOLIQUE DE LOUVAIN, Louvain-la-Nueve (BE)

( * ) Notice: Subject to any disclaimer, the term of this patent is extended or adjusted under 35 U.S.C. 154(b) by 0 days.

(21) Appl. No.: 16/875,385

(22) Filed: May 15, 2020

(65) Prior Publication Data

US 2020/0280233 A1 Sep. 3, 2020

Related U.S. Application Data

(63) Continuation of application No. 15/542,138, filed as application No. PCT/EP2016/050229 on Jan. 7, 2016, now abandoned.

(30) Foreign Application Priority Data

Jan. 7, 2015 (EP) .................................... 15150392

(51) Int. Cl.
*H02K 3/28* (2006.01)
*H02K 3/26* (2006.01)
(Continued)

(52) U.S. Cl.
CPC ........... *H02K 3/28* (2013.01); *H01F 27/2804* (2013.01); *H01F 27/323* (2013.01); *H02K 3/26* (2013.01); *H02K 2203/03* (2013.01)

(58) Field of Classification Search
CPC ......... H02K 3/28; H02K 3/26; H02K 2203/03
See application file for complete search history.

(56) References Cited

U.S. PATENT DOCUMENTS 3,319,101 A * 5/1967 Bidard ............... H02K 3/26
  310/268
3,950,666 A * 4/1976 Lazaroiu ............ H02K 3/26
  310/268

(Continued)

FOREIGN PATENT DOCUMENTS

EP 1073179 1/2001
JP 62221844 9/1987
(Continued)

OTHER PUBLICATIONS

International Searching Authority, "Search Report", issued in connection with PCT Patent application No. PCT/EP2016/050229, dated Apr. 12, 2016, 6 pages.
(Continued)

*Primary Examiner* — Alexander Talpalatski
(74) *Attorney, Agent, or Firm* — Hanley, Flight & Zimmerman, LLC

(57) ABSTRACT

Winding for an electrical machine having an inductor with pole pitch $\tau_p$, having a plurality of groups of turns intercepting a fraction of a magnetic field, each group comprising a first subgroup of turns and a second subgroup of turns of same phase at a distance equal to $\tau_p$, the turns of the first subgroup being connected in such a way that a current may flow in same direction in all turns of said subgroup, the turns of the second subgroup being connected in such a way that a current may flow in same direction in all turns of said subgroup, a turn of the first subgroup being connected to a turn of the second subgroup in such a way that the direction of said current in the first group is opposite to the direction of the current in the second subgroup.

7 Claims, 13 Drawing Sheets

(51) Int. Cl.
*H01F 27/28* (2006.01)
*H01F 27/32* (2006.01)

(56) References Cited

U.S. PATENT DOCUMENTS

| | | | | |
|---|---|---|---|---|
| 4,340,833 | A * | 7/1982 | Sudo | H02K 3/26 310/207 |
| 6,313,552 | B1 * | 11/2001 | Boast | H02K 3/28 310/14 |
| 6,411,002 | B1 * | 6/2002 | Smith | H02K 1/182 310/156.01 |
| 6,531,801 | B1 * | 3/2003 | Blazek | D06F 37/304 310/261.1 |
| 6,791,224 | B1 | 9/2004 | Ozawa et al. | |
| 8,148,870 | B2 | 4/2012 | Iki et al. | |
| 8,319,595 | B2 * | 11/2012 | Iwaya | H02K 3/26 336/200 |
| 10,461,596 | B2 * | 10/2019 | Dehez | H02K 3/26 |
| 2003/0080631 | A1 * | 5/2003 | Kageyama | G03F 7/70758 310/12.06 |
| 2010/0001610 | A1 | 1/2010 | Iki et al. | |
| 2016/0164358 | A1 * | 6/2016 | Dehez | H02K 3/28 310/208 |
| 2018/0076678 | A1 | 3/2018 | Dehez et al. | |

FOREIGN PATENT DOCUMENTS

| | | |
|---|---|---|
| JP | 2008061357 | 3/2008 |
| WO | 2007014570 | 2/2007 |
| WO | 2014207174 | 12/2014 |

OTHER PUBLICATIONS

International Searching Authority, "Written Opinion", issued in connection with PCT Patent application No. PCT/EP2016/050229, dated Apr. 12, 2016, 8 pages.

Hanselman, "Brushless Permanent Magnet Motor Design Second Edition" Magna Physics Publishing, Jan. 1, 2006, 409 pages, (uploaded in 5 parts).

United States Patent and Trademark Office, "Restriction Requirement," issued in connection with U.S. Appl. No. 15/542,138, dated Aug. 30, 2019, 6 pages.

United States Patent and Trademark Office, "Non-Final office action," issued in connection with U.S. Appl. No. 15/542,138, dated Dec. 12, 2019, 20 pages.

United States Patent and Trademark Office, "Notice of non-complaint amendment," issued in connection with U.S. Appl. No. 15/542,138, dated Mar. 23, 2020, 4 pages.

* cited by examiner

WINDING FOR AN ELECTRICAL MACHINE

RELATED APPLICATIONS

This patent arises from a continuation of U.S. patent application Ser. No. 15/542,138, which was filed on Jul. 7, 2017 and titled "Winding for an Electrical Machine". U.S. patent application Ser. No. 15/542,138 is a nationalization of International Patent Application PCT/EP2016/050229, which was filed Jan. 7, 2016 and titled "Winding for an Electrical Machine", which claims priority to European Patent Application EP 15150392.7, which was filed on Jan. 7, 2015. Priority is claimed to U.S. patent application Ser. No. 15/542,138, International Patent Application PCT/EP2016/050229, and European Patent Application EP 15150392.7. U.S. patent application Ser. No. 15/542,138, International Patent Application PCT/EP2016/050229, and European Patent Application EP 15150392.7 are hereby incorporated by reference in their entireties.

FIELD OF THE INVENTION

The invention relates to a winding for an electrical machine.

DESCRIPTION OF PRIOR ART

Electrical machines exist under many forms. These machines can be generators, producing electrical energy from mechanical energy, or motors, producing mechanical energy from electrical energy. Rotating machines have a rotor rotating around an axis in relation to a stator. Linear machines have a static element and a moving element moving linearly with respect to the static element. The present invention relates to electrical machines having an inductor producing a magnetic field and an armature winding wherein currents may flow. When the inductor is the rotor of a rotating electrical machine and is a permanent magnet, no brushes are needed for accessing the current in the armature winding. Rotating electrical machines may comprise an inductor producing a magnetic field directed mainly radially, with a winding having a generally cylindrical shape. Rotating electrical machines may also comprise an inductor producing a field directed mainly axially, with a winding having a generally disc-shape. Linear electrical machines may comprise an inductor producing a magnetic field directed mainly perpendicular to the direction of the movement and oriented towards the armature winding, this winding having a generally rectangular shape.

A winding for a slotless brushless-DC motor (BLDC motor) is known from "B. Dehez, M. Markovic, Y. Perriard, "Analysis and comparison of classical and flex-PCB slotless windings in BLDC motors," Electrical Machines and Systems (ICEMS), 2012 15th International Conference on, pp. 1-6, 21-24 Oct. 2012". This document describes the general structure of a BLDC motor. A comparison is made between a classic copper-wire winding, and a Flex-PCB winding having a simple shape (a three segment either skewed (wave) or rhombic (lap) winding) showing a potential 30% improvement in power density of the Flex-PCB winding over the classic copper-wire winding. However, no attempt is made at finding a design with optimal performance.

SUMMARY OF THE INVENTION

It is an object of the present invention to provide a winding for an electrical machine having an improved efficiency or/and an improved torque density (rotating machine) or force density (linear machine). The efficiency may be defined as the ratio of delivered power to absorbed power. In a motor, the delivered power is the mechanical power available at the motor shaft (or Force X speed for a linear motor), and the absorbed power is the electrical power absorbed by the winding. In a generator, the delivered power is the electrical power provided at the winding and the absorbed power is the mechanical power provided to the shaft (or Force X speed for a linear generator). The losses are mainly related to the electrical resistance of the winding. It is therefore an object of the present invention to provide a winding minimising these losses, while delivering a given high power when used in an electrical machine. The torque or force density may be defined as the ratio of the torque or force, respectively produced by an electrical machine and its weight. The weight of an electrical machine is mainly determined by the Joule losses arising in the armature windings. For a current of given amplitude circulating in the armature windings, the Joule losses are directly proportional to their electrical resistance while the torque or force is directly proportional to the amplitude of the magnetic flux intercepted by these windings and generated by the inductor. It is therefore an object of the present invention to provide a winding minimising the electrical resistance, while maximising amplitude of the magnetic flux intercepted by these windings and generated by the inductor.

The invention is defined by the independent claims. The dependent claims define advantageous embodiments.

According to a first aspect of the invention there is provided a winding for an electrical machine adapted for interacting with an inductor structure providing a sequence of at least one pair of north and south magnetic poles along a length, producing a magnetic field, said poles being separated by a pole pitch distance $\tau_p$ along said length, the winding comprising one or more phases, the number of phases being n. The winding is adapted for moving in relation to the inductor structure along said length. The winding has a plurality of groups of pairs of conductors, each pair of conductors forming a turn intercepting a fraction of the magnetic field. A group comprises a first subgroup of turns of one phase having a spread along said length inferior or equal to $\tau_p/n$, and a second subgroup of turns of same phase having a spread along said length inferior or equal to $\tau_p/n$, at a distance equal to $\tau_p$ from first subgroup along said length. The turns of the first subgroup are connected in such a way that a current may flow in same direction in all turns of said subgroup, the turns of the second subgroup being connected in such a way that a current may flow in same direction in all turns of said subgroup, a turn of the first subgroup being connected to a turn of the second subgroup in such a way that the direction of said current in the first group is opposite to the direction of the current in the second subgroup. The first subgroup and the second subgroup may have same number t of turns.

Preferably, said pairs of conductors comprise first conductors arranged in a first layer and second conductors arranged in a second layer.

Said first and second layers may be separated by an intermediate layer. The intermediate layer may advantageously be insulating. One extremity of a first conductor is connected to an extremity of a corresponding second conductor through an opening in said intermediate layer.

In a preferred embodiment of the invention, said first, intermediate and second layers are layers of a PCB.

In the lap version of the invention, each of said pairs of conductors of a turn form a loop. The entry and exit terminal of the turns may be in close vicinity to each other. The conductors of the winding may show a line of symmetry, the symmetry axis being a line along the length of the intermediate layer, at mid-height of the intermediate layer.

A conductor of the first layer of one turn may be extended along its length and connected through said intermediate layer to a conductor of the second layer, having a corresponding extension, so as to form a connection between two adjacent turns, the two adjacent turns being at a distance in the length direction.

In a first improvement of the invention, each of said first and second subgroup of turns having a number t of turns, first conductors of the first layer being numbered from 1 to t in the length direction, second conductors of the second layer being also numbered from 1 to t in the length direction, first conductor i of the first layer is connected at the upper end of said conductor to second conductor t−i of the second layer through a horizontal shortcut connection extending along the length direction, at decreasing heights, for i=1 to i=t−1; and first conductor i of the first layer is connected at the lower end of said conductor to second conductor t−i+1 of the second layer through a horizontal shortcut connection extending along the length direction, at increasing heights, for i=1 to i=t. Said horizontal shortcut connections may be arranged in said first and/or in said second layer.

In a second improvement of the invention, each of said first and second subgroups of turns having a number t of turns, first conductors of a first subgroup being numbered from 1 to t in the length direction, second conductors of the subsequent second subgroup being also numbered from 1 to t in the length direction;
first conductor i of the first layer is replaced by a vertical shortcut extending in the vertical direction for the extent of said conductor overlapping second conductor 1 of the second layer, for i going from the first conductor having an overlap, to the last conductor t; and
second conductor i of the second layer is replaced by a vertical shortcut extending in the vertical direction for the extent of said conductor overlapping conductor t of the first layer, for i going from the first conductor 1 to the last conductor having an overlap. These vertical shortcut connections may be arranged in said first and/or second layer, except for shortcut number t of first subgroup and shortcut number 1 of second subgroup which are only in first and second layer respectively.

In the wave version of the invention, each of said pairs of conductors of a turn form a wave. The entry and exit terminals of the turns may be at a distance near $2*\tau_p$ along said length of each other. The conductors may show a point of symmetry, the reflection point being at mid-height of the intermediate layer.

A plurality of turns may be connected in series and a plurality of series of turns may be arranged successively at a distance in the length direction, a first conductor of the first layer of one turn of one series being extended along its length and connected through said intermediate layer to a second conductor of a successive series of the second layer, having a corresponding extension, so as to form a connection between two successive series, the two successive series being at a distance in the length direction.

In a preferred version of the invention, first conductors of the first subgroup of turns are interrupted at mid height and connected through said intermediate layer with corresponding second conductors of the second subgroup, at both ends of said length, so as to form a continuous circuit.

In said first improvement of the invention, a plurality of series of turns are arranged successively at a distance in the length direction,
said plurality of series is a number t of series,
adjacent conductors being numbered from 1 to t in both the first and second layer,
and first conductor i of the first layer is connected at the upper end to second conductor t+1−i of the second layer through a horizontal shortcut connections extending along the length direction, at decreasing heights, for i=1 to i=t,
and second conductor i of the second layer being connected at the lower end to first conductor t+1−i of the first layer through a horizontal shortcut connections extending along the length direction, at increasing heights, for i=1 to i=t,
except for one of the said plurality of series where first conductor i of the first layer is connected to second conductor t−i of the second layer through a horizontal shortcut connection extending along the length direction, at decreasing heights, for i=1 to i=t−1, conductors t of the first and second layer being connected to terminals.

In said second improvement of the invention,
wherein a plurality of series of turns are arranged successively at a distance in the length direction, said plurality of series is a number t of series, adjacent conductors being numbered from 1 to t in the length in both the first and second layer, the winding is obtainable by modifications of the winding of the wave version of the invention, the modifications comprising
providing a connection of part of first conductor number 1 of first subgroup extending on upper part of intermediate layer to part of second conductor number 1 of second subgroup extending on lower part of intermediate layer, through said intermediate layer, at mid-height of said intermediate layer;
redirecting respectively
(a) part of first conductors number 2 to number t−1 of said first subgroup, extending on upper part of intermediate layer up to the point of overlap with second conductor number 1 of second subgroup to
(b) part of second conductors number 2 to number t−1 of second subgroup extending on lower part of intermediate layer from the point of overlap with first conductor number 1 of first subgroup
(c) through a vertical shortcut connection extending in a vertical direction said a vertical shortcut connection being in first and/or in second layer;
redirecting
(a) part of first conductor number t of said first subgroup, extending on upper part of intermediate layer up to the point of overlap with second conductor number 1 of second subgroup to
(b) part of first conductor number 1 of first subgroup extending on lower part of intermediate layer from the point of overlap with second conductor number t of second subgroup
(c) through a vertical shortcut connection extending in a vertical direction said a vertical shortcut connection being in first layer;
Performing similar operations after a rotation of 180° around a vertical axis being the vertical shortcut applied on first conductor t.
The above connections and redirections, with respect to both the wave and lap version of the winding, are such that a current flowing in a conductor will flow to a conductor whereto it is connected or redirected. Unused parts of conductors of the original wave or lap winding wherefrom the winding according to the second improvement are obtained are removed.

Preferably, in the winding according to the first and second improvement of the invention, i.e. the windings having vertical and/or horizontal shortcuts, these shortcuts may extend on first and second layer, except where explicitly not allowed. Having two shortcut conductors in parallel reduces the overall resistance of the winding, and therefore improves the efficiency. In these cases, a plurality of vias may be connecting said corresponding vertical and/or horizontal shortcut connection in the first and second layer.

Preferably, one or more windings are superimposed with an insulating layer being located between two superimposed windings.

According to a second aspect, the invention is related to the use of these windings in electrical machines. Windings in an elongated configuration may be used in a linear electrical machine. When wound up in a direction perpendicular to the length, the linear electrical machine may be a cylindrical winding travelling along a linear magnet having a radial field, inside the cylinder.

When the winding is wound up in the length direction, in a cylindrical configuration, the winding may be used in a rotating electrical machine, having a radial field. When wound up in a disc-shaped form, in a flat configuration, the winding may be used in a rotating electrical machine having an axial field.

SHORT DESCRIPTION OF THE DRAWINGS

These and further aspects of the invention will be explained in greater detail by way of examples and with reference to the accompanying drawings in which.

The drawings of the figures are neither drawn to scale nor proportioned. Generally, identical components are denoted by the same reference numerals in the figures.

DETAILED DESCRIPTION OF EMBODIMENTS OF THE INVENTION

Figure 1:
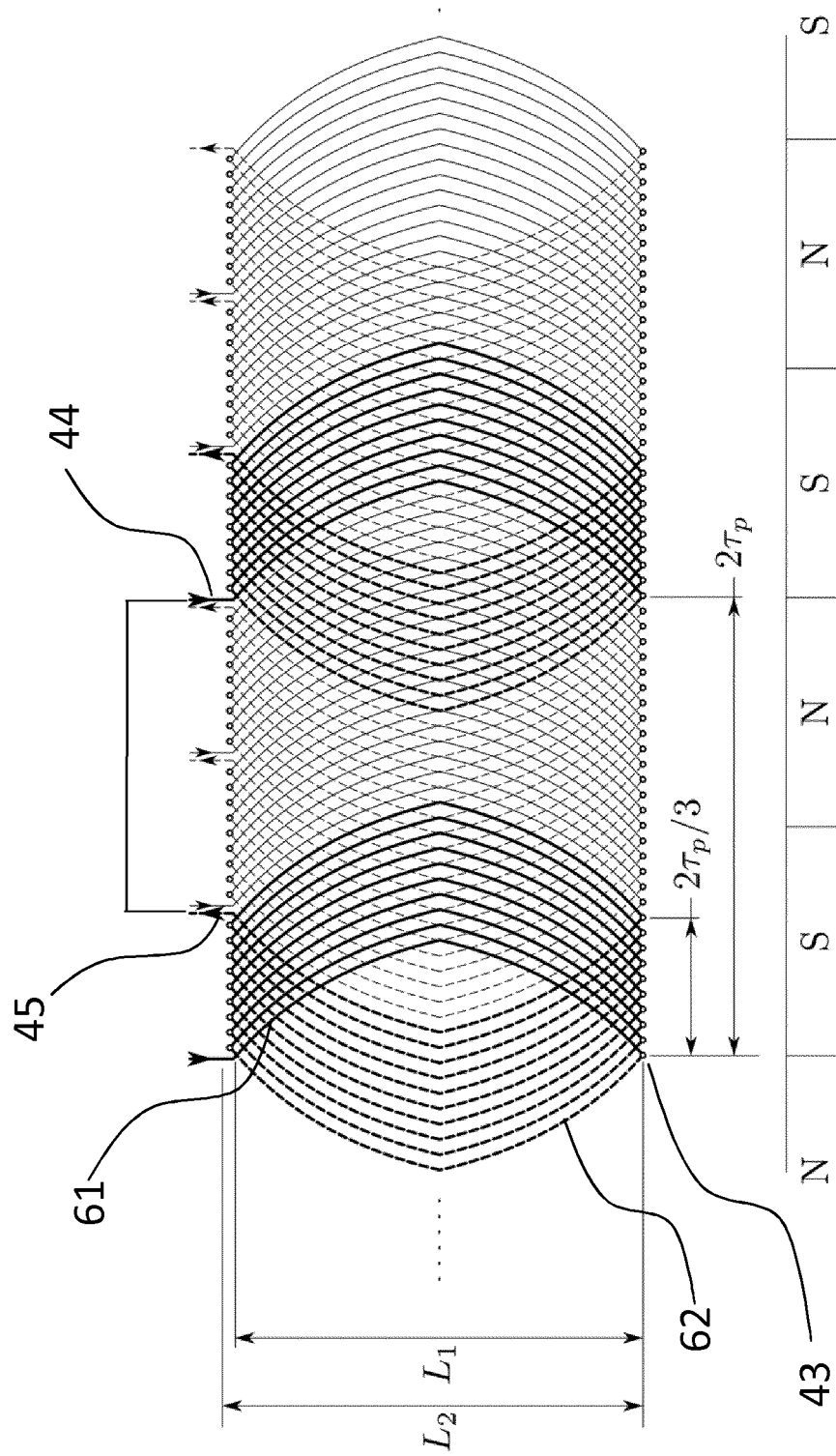
FIG. 1 is a schematic representation of a lap winding according to the prior art.

In all the examples of the prior art and of the invention discussed herein, a first conductor 61, represented as a continuous line is connected to a second conductor 62, represented as dashed lines so as to form a turn. Conductors 61, 62 may be straight lines, broken lines or curves.

A pair of conductors 61, 62 of a turn may for a loop. In this case, the conductors may show a line of symmetry, with respect to a line passing through their midpoint, and form lap windings, as shown in FIGS. 1, 3, 5, 7, and 9. The line at mid-height of the windings is represented on the drawings as a dotted line at the left and right end of the windings.

Alternatively, a pair of conductors 61, 62 of a turn may for a wave. In this case, the conductors may show a point of symmetry, and form wave windings, as shown on FIGS. 2, 4, 6, 8, 10, 11 and 12. In a first embodiment of the invention, the conductors may be wires or rods insulated from each other by many means known in the art. For example, the conductors may be coated with an insulating material. Also, the conductors may be wrapped around or in a support that may be insulating. In a second embodiment of the invention, the first conductors 61 are in one layer and the second conductors 62 are in a second layer, preferably separated from each other by an insulating layer. These conductors may be obtained by cutting out from sheets of conductive material. The cut-out may be performed by known techniques such as mechanical cutting, laser cutting or chemical attack. The connection of a first conductor 61 of the first layer to a second conductor 62 of the second layer may then be obtained by an opening in the insulating layer through which the conductors are contacted or soldered. These conductors may also be tracks printed on both sides of a printed-circuit board (PCB). The connection of a first conductor 61 on a first side of the PCB to a second conductor 62 on the second side of the PCB may then be realised by a via 43, i.e. a hole through the PCB, containing conductive material. The term "via" is used herein for designating the different connecting means of a first conductor 61 to a second conductor 62. Vias 43 are represented on the figures by a little circle. All these solutions are well known in the art. In all the examples discussed, the length direction will be the direction from left to right of the figure and the height direction, the direction from the bottom to the top of the figure. The windings are represented as flat structures, as this will be the case for linear motors or generators. The windings may also be wound up in a cylindrical fashion one or more times along the length direction, for use in a rotating electrical machine having a radial magnetic field. The windings may also be wound up in a cylindrical fashion one or more times along a direction perpendicular to the length direction, for use in a linear tubular electrical machine having a radial magnetic field. The winding may also be wound up in a disc fashion, for use in an electrical machine having an axial magnetic field. The "length" is then to be understood as the azimuthal angular distance. When the winding is wound up more than one time, or when a plurality of windings are superimposed, a fourth insulating, and optionally adhesive, sheet may be inserted between each winding layer in order to avoid unwanted electrical short circuits between winding turns/loops.

FIG. 1 is a schematic representation of an example of a lap winding for an electrical machine according to the prior art. A first conductor 61 having a line symmetry with respect to a line represented by the dots at the left and at the right of the figure is connected to a second conductor 62 through a via 43 at the bottom of the figure to form a turn. A plurality of such turns (in this example 10 turns) are connected in series so as to form a group of turns, having a current entry terminal 44 and a current exit terminal 45. Successive turns are displaced with respect to each other in the length direction. This may be obtained by extending the first and second conductors beyond their height L1 up to a height L2, and connecting a turn to an adjacent turn through a via 43 at the height L2. FIG. 1 displays a three phase winding, a first phase being drawn in bold line and the other two phases in thin lines. The inductor structure providing a magnetic field is represented schematically as a bar, and shows two North poles and two South poles. This inductor structure is represented for clarity at the bottom of the winding, but is overlapping the winding, so that the turns intercept the magnetic field. The electrical machine is designed in such a manner that the winding may move in relation to the magnet structure in the length direction. The separation distance in the length direction between a north pole and a south pole is $\tau_p$. As can be seen in FIG. 1, the distance between two successive groups of a phase in a conventional winding is $2\tau_p$ such that these two groups intercept the same field, both in sign and amplitude. The extent of a group in the length direction is $2\tau_p$ divided by the number of phases. This condition is required for preventing an overlap of successive groups of turns. Current exit terminal 45 of one group may be connected to current entry terminal 44 of a successive group of same phase, so that currents in the conductors flow in the directions suggested by the arrows. The prior art winding of FIG. 1 is discussed more in detail at paragraphs [0030] and FIG. 7a of WO2014/207174.

Figure 2:
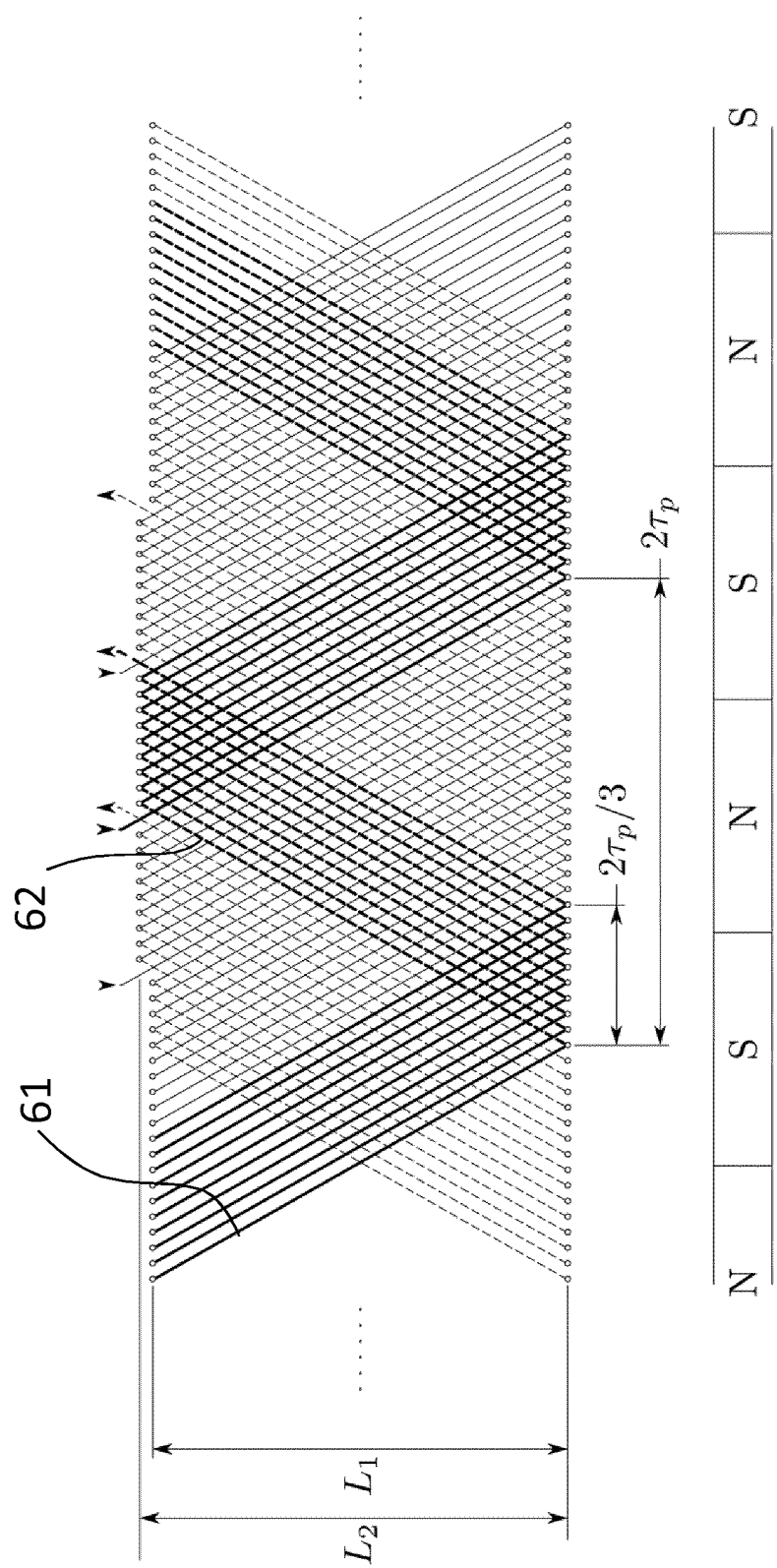
FIG. 2 is a schematic representation of a wave winding according to the prior art.
Figure 3:
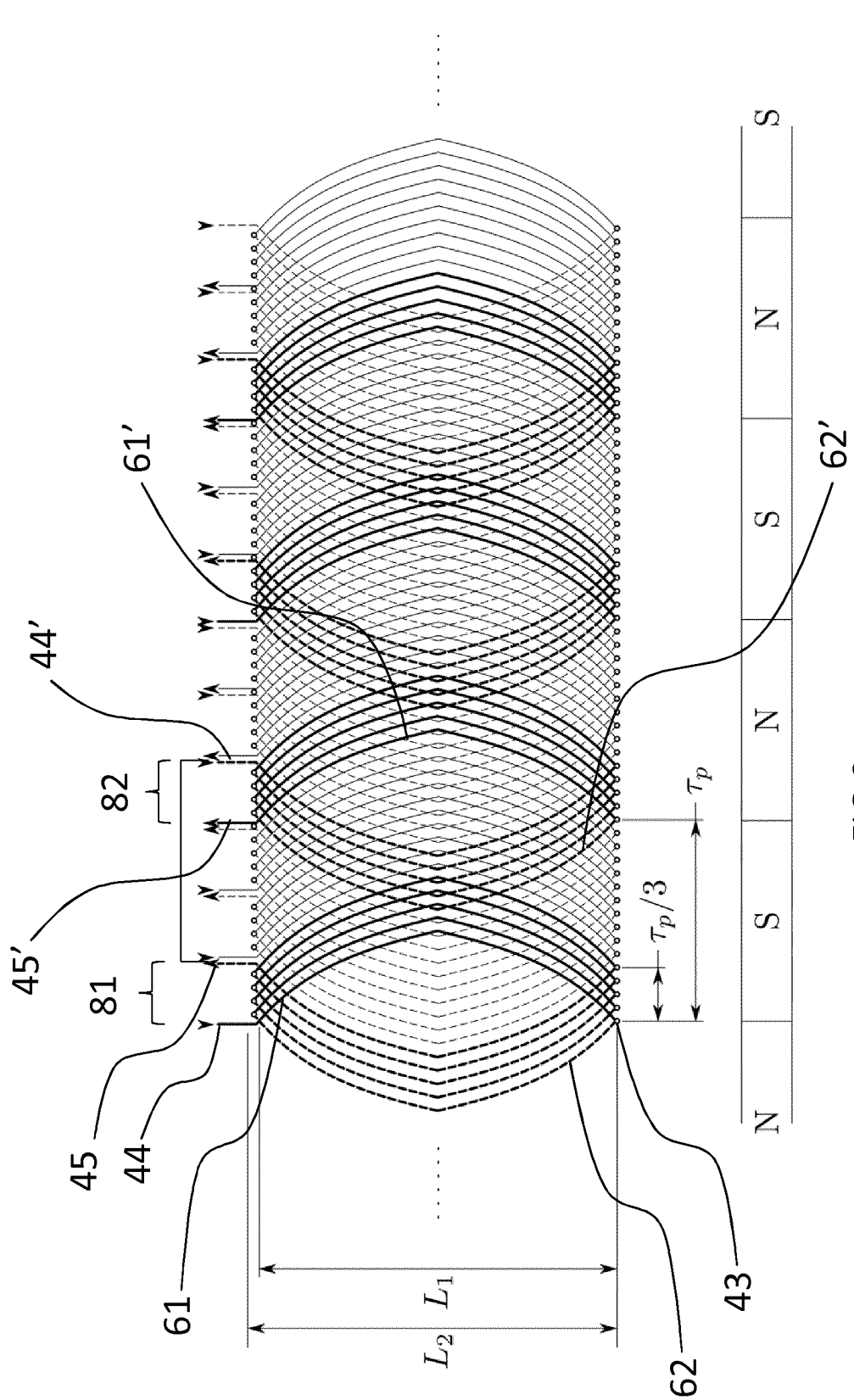
FIG. 3 is a schematic representation of a lap winding according to an embodiment of the invention.

FIG. 2 is a schematic representation of an example of a winding for an electrical machine according to the prior art, similar to FIG. 1 with the difference that the conductors 61, 62 form wave turns. The conductors 61, 62 are formed as straight lines, but may also be formed as polygonal lines or curves, as shown in other examples. Here, as in FIG. 1, the distance between two groups is $2\tau_p$, and the extent of a group in the length direction is $2\tau_p/3$ FIG. 3 is a schematic representation of a lap winding according to an embodiment of the invention. With respect to the winding of FIG. 1, the winding of FIG. 3 has been modified as follows: the group of turns has been divided in a first subgroup 81 of turns, and a second subgroup of turns 82. Second subgroup 82 is located from first subgroup 81 at a distance $\tau_p$ in the length direction. The extent of a subgroup in the length direction is $\tau_p$ divided by the number of phases, i.e. half the extent of a group in the winding of FIG. 1. This condition is required for preventing an overlap of successive subgroups of turns.

Current entry/exit terminals 44/45 of the first subgroup, and 44'/45' of the second subgroup are in opposite orders so that a current flowing in conductor 61 of first subgroup would flow in opposite direction in corresponding conductor 61' of second subgroup. This condition can be met when current exit terminal 45 of one subgroup is connected to current entry terminal 44' of another successive subgroup of same phase. As can be seen on FIG. 3, when a first subgroup intercepts the field of a north pole, a subsequent second subgroup of same phase intercepts the field of a south pole. The inventors have determined that this winding according to the invention has a torque or force density improved by approximately 15% with respect to corresponding winding of the prior art of FIG. 1 having same characteristics, for a three-phase winding. This improvement results from the fact that the turns of a phase intercept a magnetic flux, and therefore generate an electromotive force, whose phase spreading is reduced by a factor of two with respect to the prior art winding. The spreading factor linking the electromotive force amplitude of a winding to the electromotive force amplitude of one turn multiplied by the number of turns and given by the mathematical formula:

$$2\sin(\alpha/2)/\alpha$$

where $\alpha$ is the maximum phase difference, increases therefore from 0.827 to 0.955, in a three phase winding. The phase spreading is reduced from 120 to 60 electrical degrees.

Figure 4:
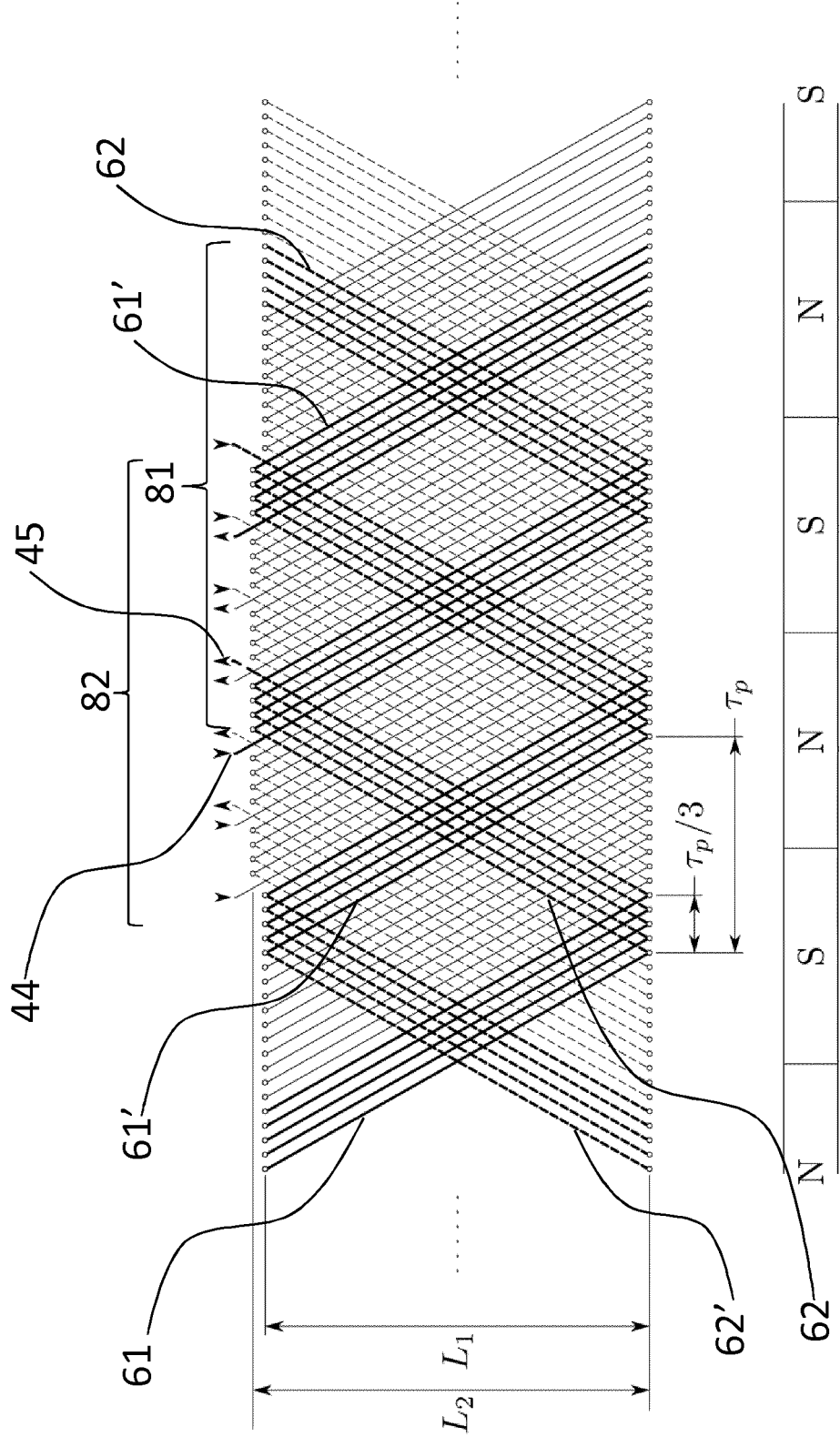
FIG. 4 is a schematic representation of a wave winding according to an embodiment of the invention.

FIG. 4 is a schematic representation of a wave winding according to an embodiment of the invention. The modifications of the winding of FIG. 1 to the winding of FIG. 3 have been applied similarly to the winding of FIG. 2. Same improvement of efficiency is obtained.

Figure 5:
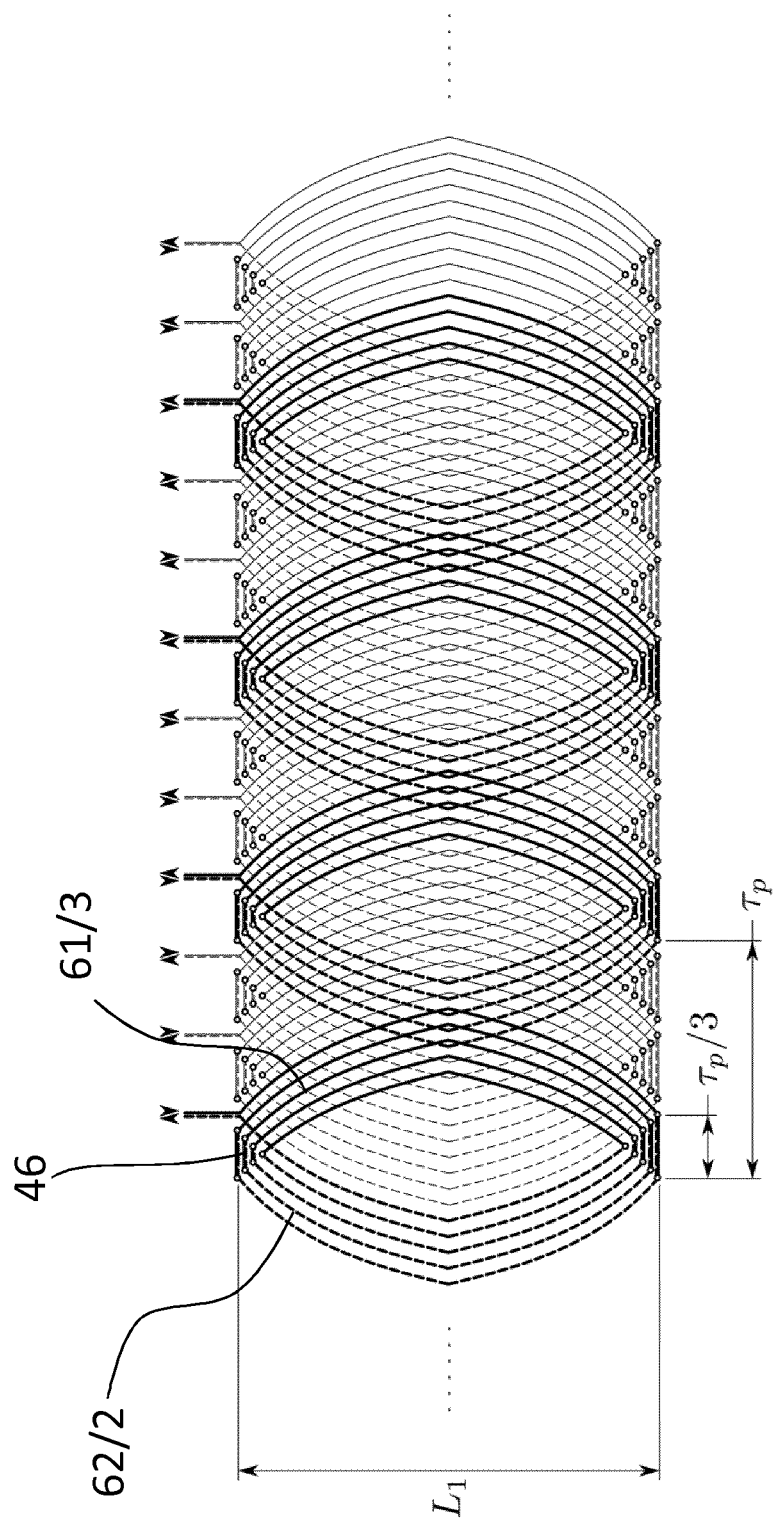
FIG. 5 is a schematic representation of a lap winding according to a first improvement of the embodiment of the invention.

FIG. 5 is a schematic representation of a lap winding according to a first improvement of the embodiment of the invention. The improvement lies in the manner of interconnecting turns of a subgroup with respect to the manner of interconnecting the turns of a subgroup in FIG. 3. With reference to FIG. 5, first conductor 61, numbered 3 in the first subgroup is connected to second conductor numbered 2 in the same subgroup through a horizontal shortcut connection 46. For reducing the phase resistance, this horizontal shortcut connection may be made in parallel in the first layer and in the second layer. Similar shortcut connections are made for all turns of a subgroup both at the top and at the bottom of the winding. As is well known by the man skilled in the art, only the component of currents perpendicular to the relative movement (i.e. axial currents in a cylindrical electrical machine) will generate a torque or force in a motor. Therefore, in the nearly triangular regions at the bottom and at the top of the winding of FIG. 3 where first conductors 61 if the front layer and second conductors 62 of the second layer overlap, the resulting torque will be nil. This explains why the improved mode of inter-turn connection, represented in FIG. 5 represents no loss in torque or force when the electrical machine is a motor while reduces the phase resistance. For a same geometry and currents, the winding of FIG. 5 will produce the same torque or force as the winding of FIG. 3. Compared to the winding of FIG. 3, the winding of FIG. 5 has shorter tracks, and therefore a reduced phase resistance $R_{ph}$. For the same reasons, when the electrical machine is a generator, the emf generated with the winding of FIG. 3 and FIG. 5 will be equivalent.

Figure 6:
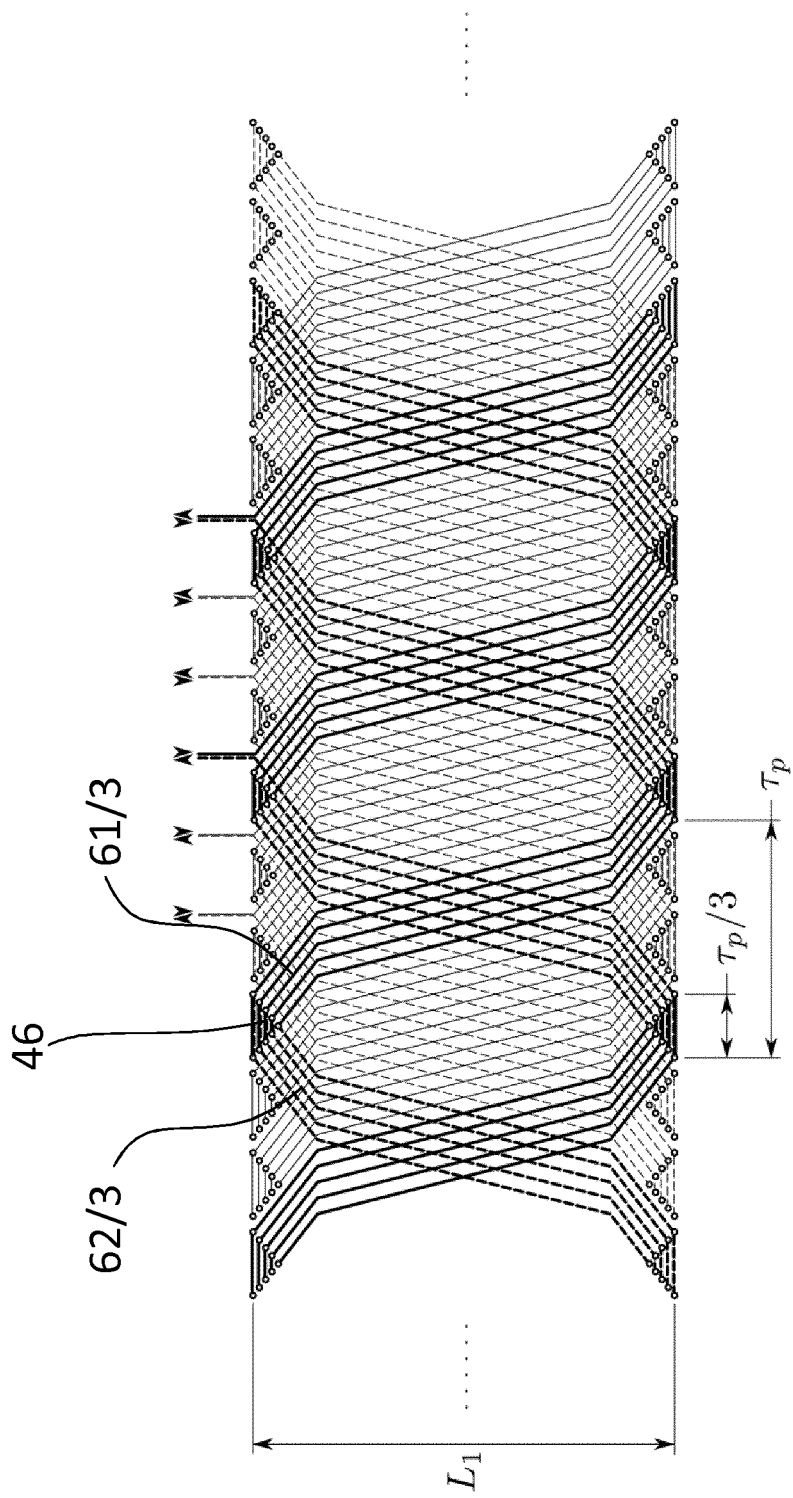
FIG. 6 is a schematic representation of a wave winding according to same first improvement of the embodiment of the invention.

FIG. 6 is a schematic representation of a wave winding according to same first improvement of the embodiment of the invention. The improvement corresponds to the modifications made to the winding of FIG. 3 for obtaining the winding of FIG. 5 but applied to the winding of FIG. 4. Horizontal shortcut connections 46 reduce the overall length of the conductors, without reducing the torque or force of the electrical machine. The applicants have observed that, for a conventional design, the resulting torque or force density is improved by more than 10% with respect to the winding without horizontal shortcuts.

Figure 7:
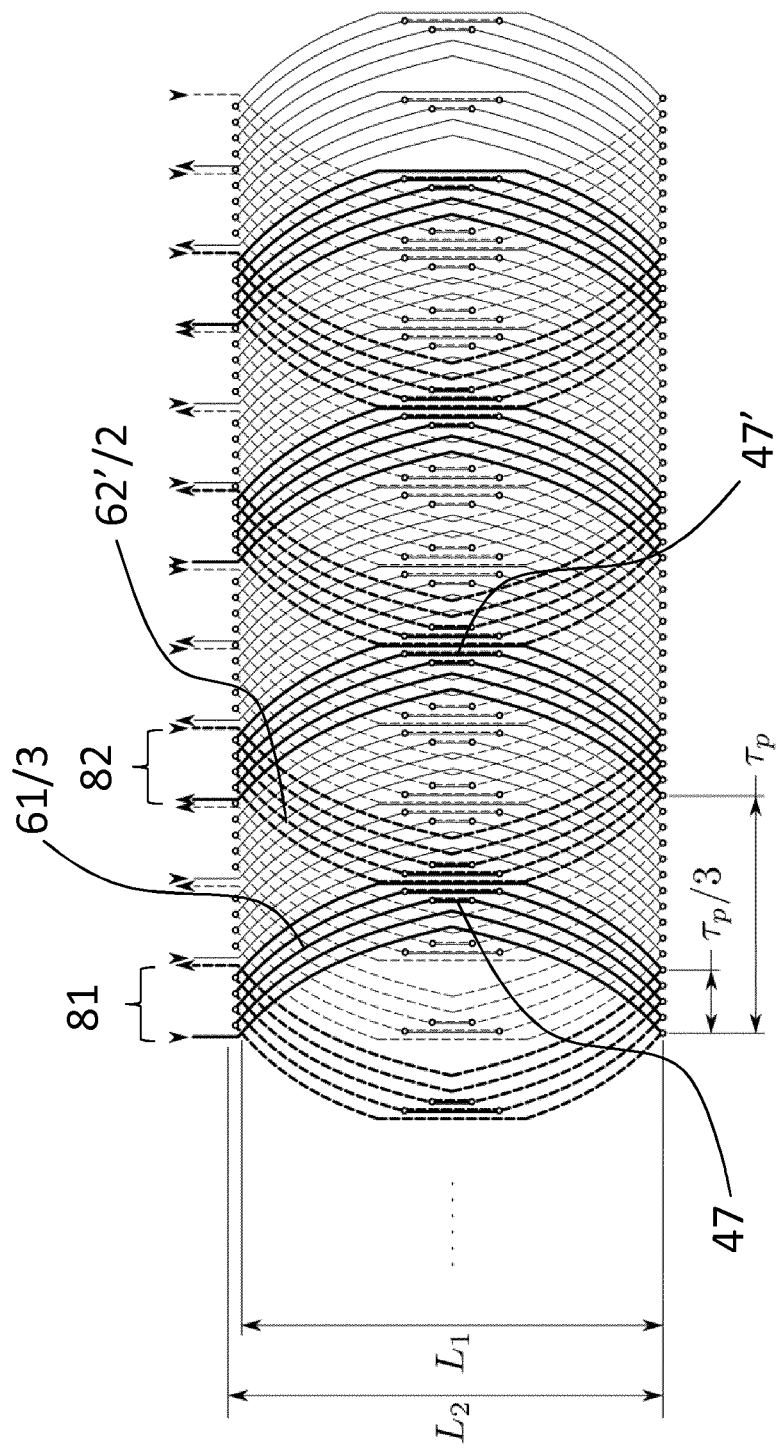
FIG. 7 is a schematic representation of a lap winding according to a second improvement of the embodiment of the invention.

FIG. 7 is a schematic representation of a lap winding according to a second improvement of the embodiment of the invention. The improvement lies in a modification of the shape of conductors 61, 62 in the median region of their height. With reference to FIG. 7, as an example, first conductor 61, numbered 3 in the first subgroup 81 is shortcut beginning from the point of overlap with conductor 62 numbered 1 of second subgroup 82, with a vertical shortcut connection 47.

Second conductor 62 of second subgroup 82 is also shortcut with a vertical shortcut connection 47' from the point of overlap with the last conductor 61 of preceding first subgroup (conductor number 2 in the example shown).

Except for the last vertical shortcut of the first subgroup and first vertical shortcut of the second subgroup, these shortcuts may extend in parallel in the first and second layer, which further reduces the phase resistance. The last shortcut of the first subgroup and the first vertical shortcut of the second subgroup overlap, and, being part of different circuits, may not be combined in parallel, but must remain in the first and second layer respectively. For reasons similar to the reasons explained in relation to the horizontal shortcuts and FIG. 5, the winding of FIG. 7 will produce same torque or force as the corresponding winding of FIG. 3 without vertical shortcut. It has been determined, that, for the conductor shape of FIG. 7, the resulting torque or force efficiency is improved by more than 1% with respect to the winding of FIG. 3, without vertical shortcuts.

Figure 8:
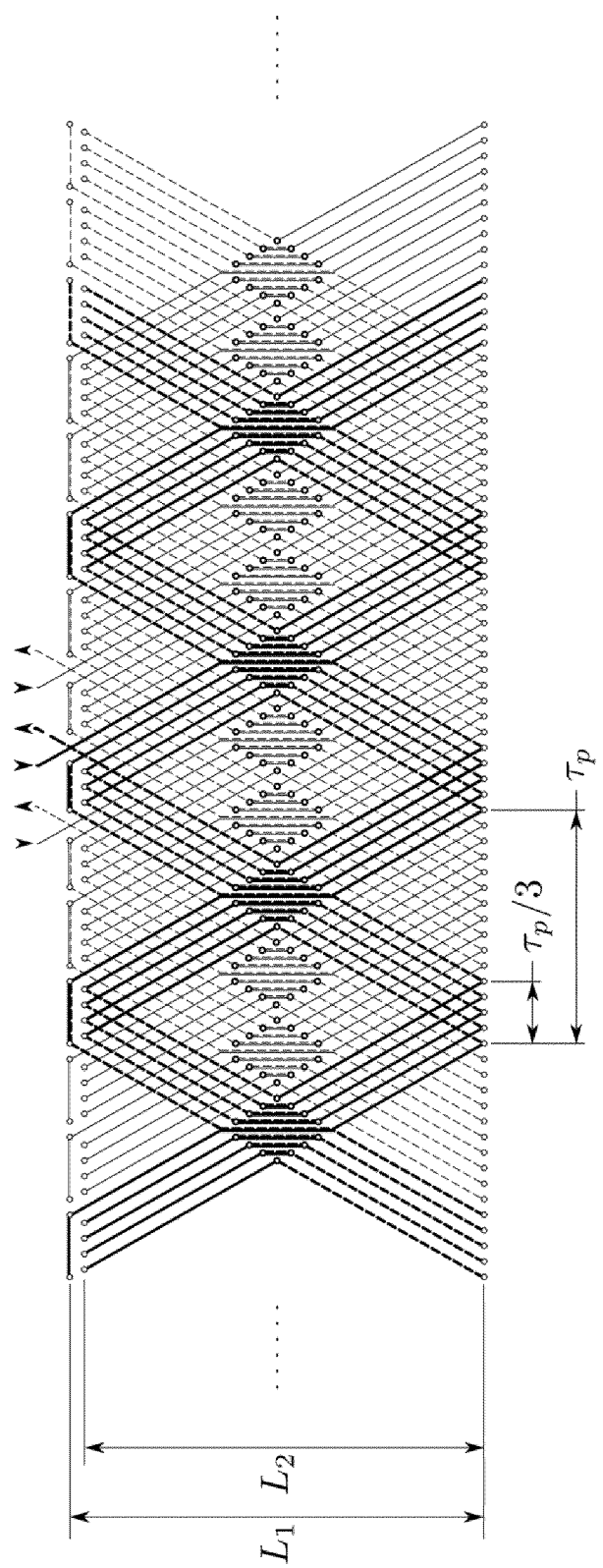
FIG. 8 is a schematic representation of a wave winding according to same second improvement of the embodiment of the invention.
Figure 9:
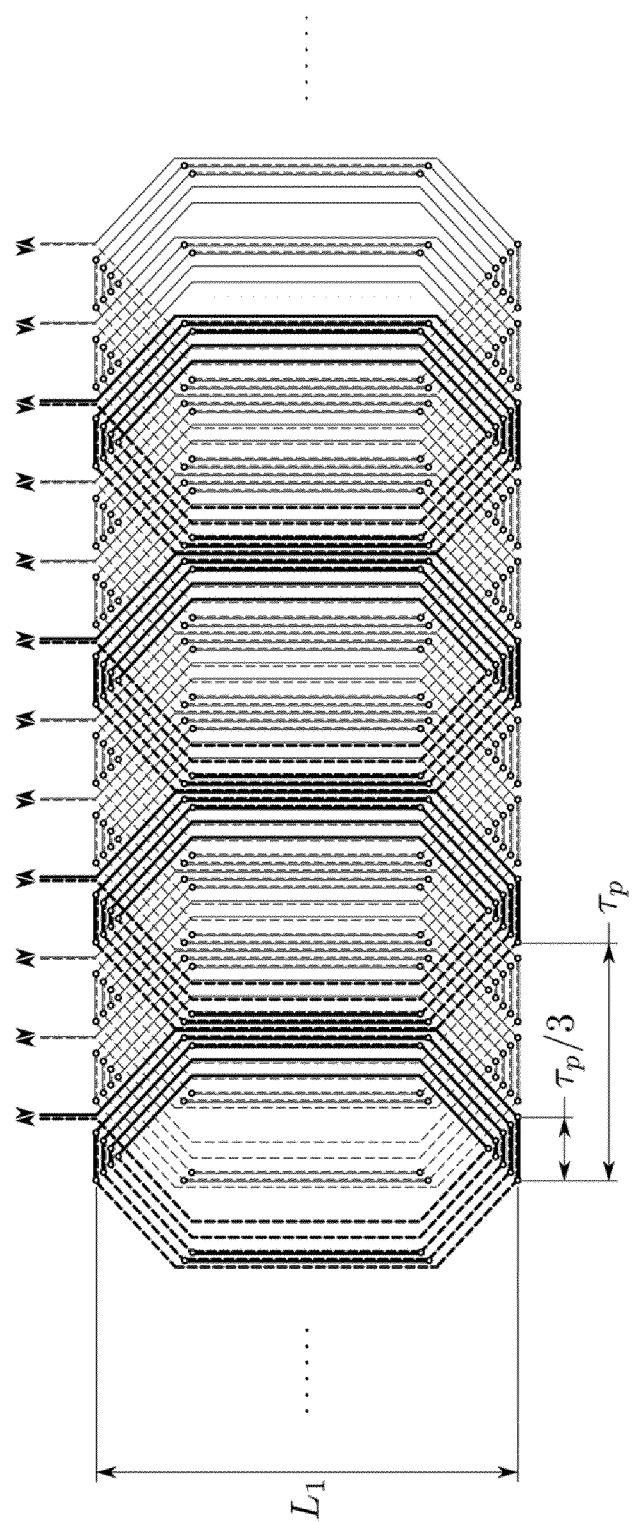
FIG. 9 is a schematic representation of a lap winding combining first and second improvements of the embodiment of the invention.
Figure 10:
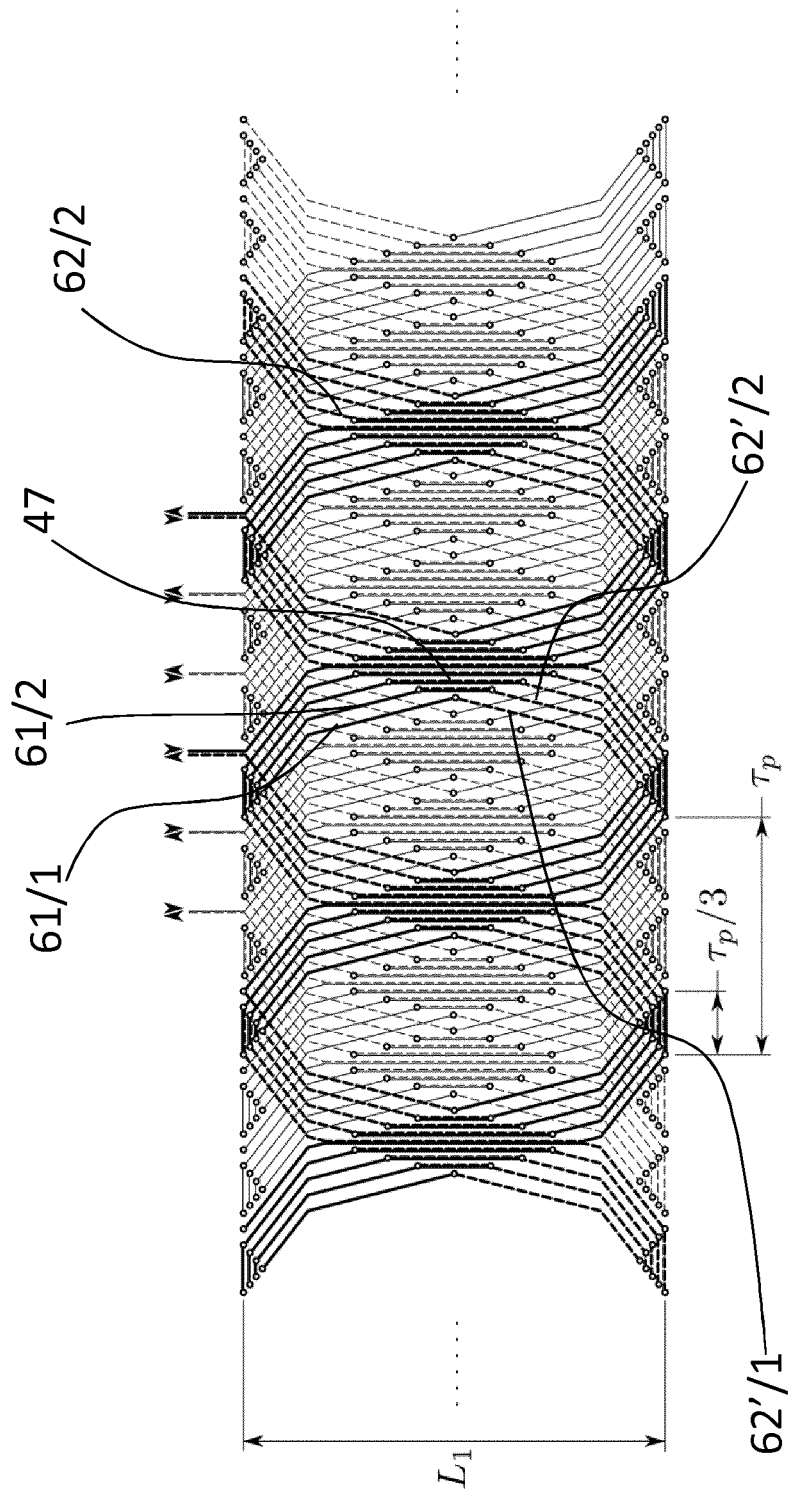
FIG. 10 is a schematic representation of a wave winding combining first and second improvement of the embodiment of the invention.

FIG. 8 is a schematic representation of a wave winding according to same second improvement of the embodiment of the invention. The improvement corresponds to the modifications made to the winding of FIG. 3 for obtaining the winding of FIG. 7, but applied to the winding of FIG. 4. Vertical shortcut connections 47 reduce the overall length and resistance of the winding, without reducing the torque or force of the electrical machine FIGS. 9 and 10 are schematic representations of a lap and a wave winding, respectively, combining first and second improvements of the embodiment of the invention, where the conductors have three linear segments. This example shows that the invention and its improvements apply similarly to windings where the conductors are straight lines, broken lines or curves.

The conception of a wave winding according to the second improvement of the invention (i.e. having the vertical shortcuts) will be described by describing the modifications to be performed on the winding of FIG. 4 for obtaining the winding of FIG. 10, and focusing only on the vertical shortcut improvement, located in a diamond (lozenge) shaped area at mid-height of the winding.

First conductors 61 (continuous lines) of first subgroup are numbered sequentially from left to right and noted 61/1 to 61/$t$ ($t$ being equal to 5 in FIG. 10). Similarly, second conductors 62' (represented as dashed lines) of second subgroup are numbered 62'/1 to 62'/$t$.

In a first modification (a), first conductor 61/1 is interrupted at mid-height of the winding, and connected through a via to the part of conductor 62'/1 on the lower part of the winding. The remaining parts of conductors 61/1 and 62'/1 will be discussed below.

In a second modification (b), upper parts of conductors 61/2 to 61/$t-1$ are kept up to the point where they overlap second conductor 62'/1 of second group. From that point of overlap, they are interrupted and prolonged downwards by a vertical shortcut 47 up to the point where conductor 62'/2 to 62'/$t-1$ overlap conductor 61/1. From that second point of overlap, the vertical shortcuts are connected to the parts of conductors 62/'2 to 62'/$t-1$ extending downwards, respectively.

In a third modification (c), upper part of conductor 61/$t$ is kept up to the point where it overlaps second conductor 62'/1 of second group. From that point of overlap, it is interrupted and prolonged downwards by a vertical shortcut 47 up to the point where conductor 62'/$t$ overlaps conductor 61/1. From that second point of overlap, the vertical shortcuts are connected to the part of first conductor 61/1 of first group, extending downwards.

Unused parts of conductors of original, unmodified winding are removed. Vertical shortcuts 2 to $t-1$ may extend in parallel on both sides of intermediate layer, thereby reducing the resistance of the winding. Last vertical shortcut t may extend only on one side. Modifications (a) (b) and (c) address the left hand side of the diamond region of FIG. 10. Similar modifications are performed for the right hand side of the diamond region of FIG. 10: the winding is rotated 180° around the vertical diagonal of the diamond, and same connections and redirections are performed on conductors now occupying locations of former conductors Same operations may be performed on all diamonds occurring in the winding. It can be seen from the drawing that e.g. the currents in conductors 61/1 to 61/$t-1$ of first subgroup in upper part of winding, and flowing downwards, will flow in the natural direction, also downwards, in conductors 62'/1 to 62'/$t-1$, producing the same motor or generator effect as with the winding of FIG. 4, but with a reduced resistance, and therefore an improved efficiency.

In the present discussion "to overlap" it is to be understood as meaning "to be on same position but on different sides of an intermediate layer"

All examples discussed in relation to FIGS. 3 to 10 have been described without discussing the connections at the left and right ends of the winding. For the lap windings of FIGS. 3, 5, 7, and 9, the situation is simple: each of the subgroups form coils, each having one current entry terminal 44 and current exit terminal 45. These may be connected to external means or interconnected so as to form a number of phases each having a current entry terminal and a current exit terminal. The winding may be of any length and have a plurality of groups of turns and may be wound up in a cylindrical fashion, with an insulating layer between two folds, in such a way that corresponding groups and subgroups of same phase overlap. In the case of a PCB winding, all of the conductors, including the interconnections between subgroup at the top height of the PCB may be produced with a single PCB, without requiring any additional wiring.

Figure 11:
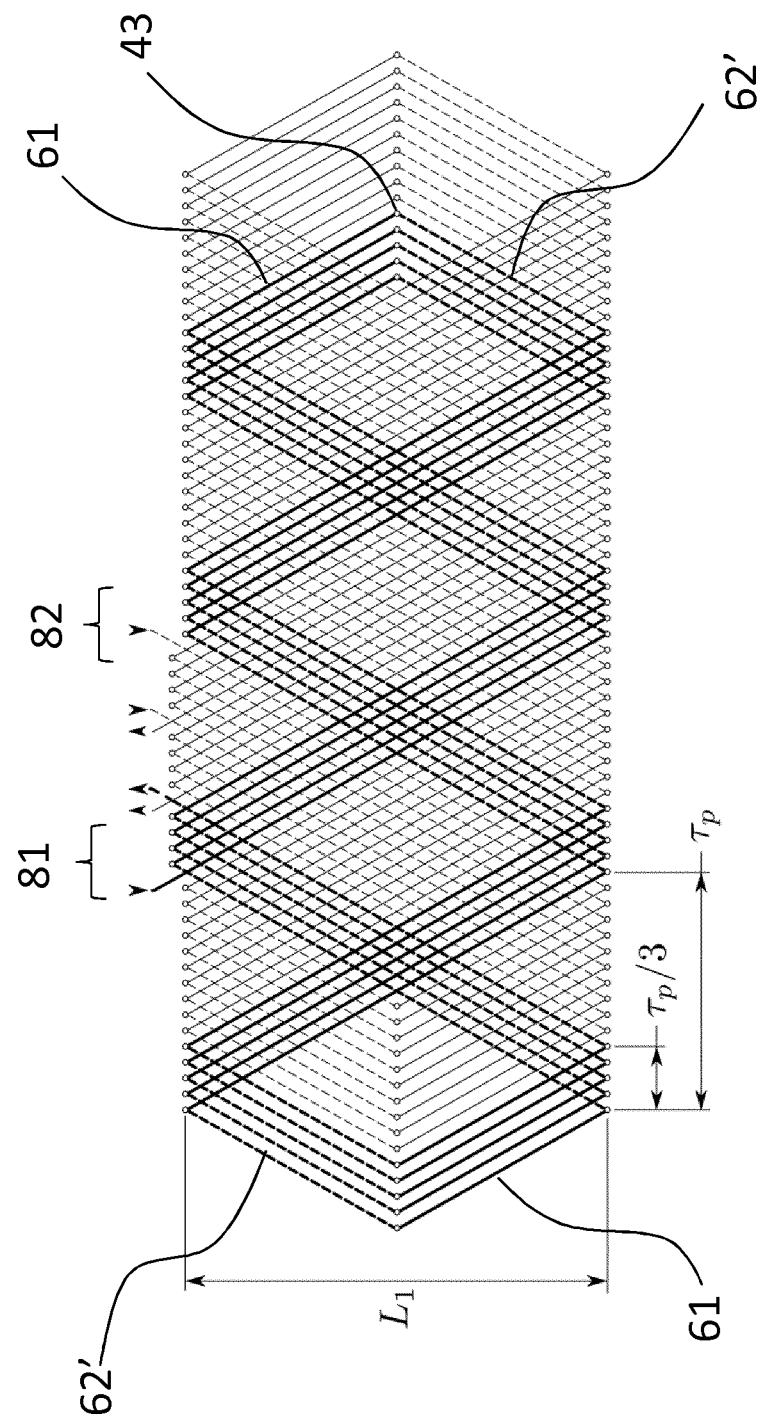
FIG. 11 is a schematic representation of a wave winding having a third improvement of the embodiment of the invention.
Figure 12:
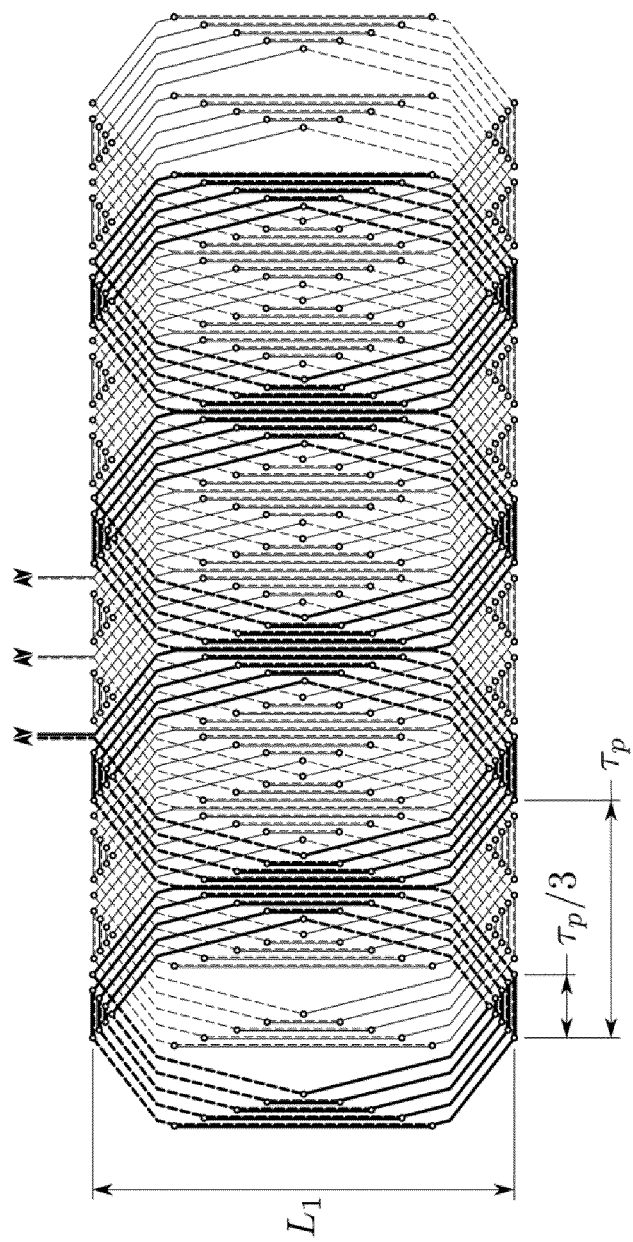
FIG. 12 is a schematic representation of a wave winding having a third improvement of the embodiment of the invention in combination with the first and second improvement of the invention.

In the wave winding of FIG. 4, the second conductors 62 at the right hand end may be connected to corresponding first conductors 61 at the left hand end of the winding. This may be performed with external wiring or additional tracks at the top of the PCB. FIGS. 11 and 12 show examples of a third improvement of the invention where the need for these external wiring or additional tracks is avoided. Referring to FIG. 11, a conductor 61 of the first subgroup 81 of turns in the first layer, at the right hand end of the winding is interrupted at mid height of the intermediate layer and connected through said intermediate layer with via 43 to corresponding lower half of conductor 62 of the second subgroup 82 in the other layer. This is performed for all conductors of this subgroup, and is performed in a similar fashion at the left hand side of the winding. This results in having for each phase a closed circuit having current entry terminal 44 and current exit terminal 45. The resulting winding can be produced as a single PCB, without requiring any additional wiring or connections. Although FIG. 11 shows a winding having three turns in each phase and each subgroup, a winding having an arbitrary number of turns may be produced, according to the needs of the electrical machine for which it is intended. FIG. 12 shows an example of a winding having same end-wraps of conductors in a winding having both horizontal and vertical shortcuts. The winding of FIG. 12 combines all improvements of the invention.

Figure 13:
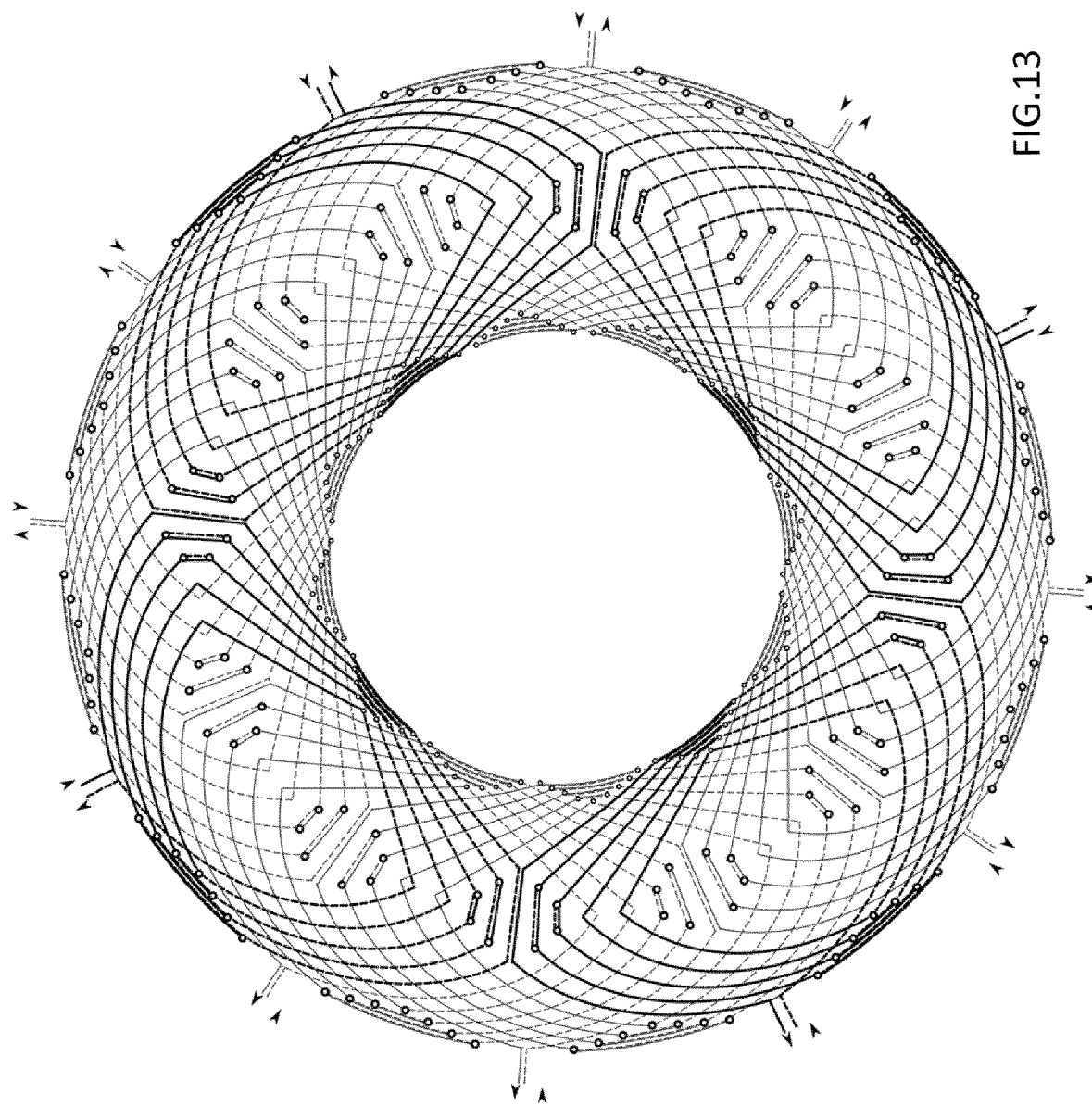
FIG. 13 is a schematic representation of a lap winding combining first and second improvement of the embodiment of the invention for use in a rotating electrical machine having an axial field.

FIG. 13 is a schematic representation of a lap winding combining first and second improvement of the embodiment of the invention for use in a rotating electrical machine having an axial field. This winding is adapted for interacting with an inductor having two north poles and two south poles producing a magnetic field oriented along the axis, i.e. perpendicularly to the figure. The poles are distributed at 90 degrees from each other. The winding has two first subgroups 81 and two second subgroups 82 at 90 degrees angular distance from each other.

The present invention has been described in terms of specific embodiments, which are illustrative of the invention and not to be construed as limiting. More generally, it will be appreciated by persons skilled in the art that the present invention is not limited by what has been particularly shown and/or described hereinabove.

Reference numerals in the claims do not limit their protective scope. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements.

The invention may also be described as follows: the invention provides a winding for an electrical machine adapted for interacting with an inductor structure providing a sequence of at least one pair of north and south magnetic poles along a length, producing a magnetic field, said poles being separated by a pole pitch distance $\tau_p$ along said length. The winding may comprise one or more phases, be adapted for moving in relation to the inductor structure along said length, and have a plurality of groups of pairs of conductors, each pair of conductors forming a turn intercepting a fraction of said magnetic field. According to the invention, a first subgroup of turns of one phase have a spread along the length inferior or equal to $\tau_p/n$, a second subgroup of turns of same phase have a spread along said length inferior or equal to $\tau_p/n$, at a distance equal to $\tau_p$ along said length, the turns of the first subgroup being connected in such a way that a current may flow in same direction in all turns of said subgroup, the turns of the second subgroup being connected in such a way that a current may flow in same direction in all turns of said subgroup, a turn of the first subgroup being connected to a turn of the second subgroup in such a way that the direction of said current in the first group is opposite to the direction of the current in the second subgroup. The first subgroup and the second subgroup may have the same number t of turns.

The invention claimed is:

1. A winding for an electrical machine adapted for interacting with an inductor structure providing a sequence of at least one pair of north and south magnetic poles along a length, producing a magnetic field, the poles being separated by a pole pitch distance $\tau_p$ along the length, the winding comprising:

one or more phases, the number of phases being n; and a plurality of groups of pairs of conductors, each pair of conductors forming a turn intercepting a fraction of the magnetic field, wherein a first group of the plurality of groups includes:

a first subgroup of turns of one phase having a spread along the length inferior or equal to $\tau_p/n$; and a second subgroup of turns of same phase having a spread along the length inferior or equal to $\tau_p/n$, at a distance equal to $\tau_p$ from first subgroup along the length, the turns of the first subgroup being connected such that a current may flow in same direction in all turns of the first subgroup, the turns of the second subgroup being connected such that a current may flow in same direction in all turns of the second subgroup, and a turn of the first subgroup being connected to a turn of the second subgroup such that the direction of the current in the first subgroup is opposite to the direction of the current in the second subgroup, the first subgroup and the second subgroup having same number t of turns and wherein the winding is adapted for moving in relation to the inductor structure along the length, said pairs of conductors comprise each a first conductor arranged in a first layer and a second conductor arranged in a second layer, the first and second layers are separated by an intermediate layer, the intermediate layer having a height perpendicular to the length, the intermediate layer being insulating, an extremity of the first conductor being connected to an extremity of the second conductor through an opening in the intermediate layer, each of the pairs of conductors forming a turn form a wave, and first conductors of the first subgroup of turns are interrupted at mid height and connected through the intermediate layer with corresponding second conductors of the second subgroup, at both ends of the length to form a continuous circuit.

2. The winding according to claim 1 wherein the first, intermediate, and second layers are layers of a PCB.

3. The winding according to claim 1, wherein a plurality of turns are connected in series and a plurality of series of turns are arranged successively at a distance in the length direction, a first conductor of the first layer of one turn of one series is extended along its length and connected through the intermediate layer to a second conductor of a successive series of the second layer, having a corresponding extension, so as to form a connection between two successive series, the two successive series being at a distance in the length direction.

4. Use of the winding of claim 1, where the winding is in an elongated configuration, in a linear electrical machine.

5. The use according to claim 4, where the winding is wound up in a direction perpendicular to the length.

6. Use of the winding of claim 1, where the winding is wound up in the length direction, in a cylindrical configuration, in a rotating electrical machine.

7. Use of the winding of claim 1, wherein one or more windings are superposed with an insulating layer being located between two superposed windings.

* * * * *